United States Patent
Xu et al.

(10) Patent No.: US 7,248,251 B2
(45) Date of Patent: Jul. 24, 2007

(54) WIRELESS DISPLAY SYSTEMS AND STYLII

(75) Inventors: Jianping Xu, Portland, OR (US); Stephen H. Hunt, Felton, CA (US)

(73) Assignee: Intel Corporation, Santa Clara, CA (US)

(*) Notice: Subject to any disclaimer, the term of this patent is extended or adjusted under 35 U.S.C. 154(b) by 587 days.

(21) Appl. No.: 10/794,695

(22) Filed: Mar. 5, 2004

(65) Prior Publication Data

US 2004/0169644 A1    Sep. 2, 2004

Related U.S. Application Data

(63) Continuation of application No. 09/751,048, filed on Dec. 29, 2000, now Pat. No. 6,717,073.

(51) Int. Cl.
*G09G 5/00* (2006.01)

(52) U.S. Cl. .................................. 345/179; 178/18.04

(58) Field of Classification Search ........ 345/173–175, 345/179, 177, 176, 178; 178/18.04, 19.02, 178/18.03, 19.01
See application file for complete search history.

(56) References Cited

U.S. PATENT DOCUMENTS

| | | | | |
|---|---|---|---|---|
| 4,012,588 A | 3/1977 | Davis et al. | ................. | 178/18 |
| 4,506,354 A | 3/1985 | Hansen | ..................... | 367/101 |
| 4,507,557 A | 3/1985 | Tsikos | ....................... | 250/341 |
| 4,758,691 A | 7/1988 | De Bruyne | ................. | 178/19 |
| 4,814,552 A * | 3/1989 | Stefik et al. | ............ | 178/19.02 |
| 4,862,152 A | 8/1989 | Milner | ..................... | 340/712 |
| 5,142,506 A | 8/1992 | Edwards | ................... | 367/127 |
| 5,308,936 A | 5/1994 | Biggs et al. | ................. | 178/18 |
| 5,317,140 A | 5/1994 | Dunthorn | .................. | 250/221 |
| 5,517,579 A * | 5/1996 | Baron et al. | ................ | 382/187 |

(Continued)

FOREIGN PATENT DOCUMENTS

EP    0312481    4/1989

(Continued)

OTHER PUBLICATIONS

"Getting Started With Your Mimio", *Virtual Ink, Owners Manual*, (1999).

(Continued)

*Primary Examiner*—Richard Hjerpe
*Assistant Examiner*—Abbas Abdulselam
(74) *Attorney, Agent, or Firm*—Schwegman, Lundberg, Woessner & Kluth P.A.

(57) ABSTRACT

A wireless coordinate input system for a display system includes a stylus that transmits ultrasonic energy to a plurality of ultrasonic receiving stations in a projection plane. In an embodiment, the stylus may include one ultrasonic transmitter used for determination of three-dimensional coordinates of the stylus relative to the projection plane. The stylus may also include a second ultrasonic transmitter controlled by a pressure-activated switch. When the stylus is pressed against the projection plane, the second transmitter turns on and is used for determination of two-dimensional coordinates of the stylus in the projection plane. The stylus may also include a higher frequency burst transmitter used to generate a time reference. One or more of the ultrasonic receiving stations may also include an ultrasonic transmitter for calibration.

23 Claims, 5 Drawing Sheets

U.S. PATENT DOCUMENTS

| | | | |
|---|---|---|---|
| 5,526,023 A | 6/1996 | Sugimoto et al. | 345/173 |
| 5,570,299 A | 10/1996 | Tokioka et al. | 364/560 |
| 5,673,386 A | 9/1997 | Batra | 395/183.14 |
| 5,686,705 A | 11/1997 | Conroy et al. | 178/18.05 |
| 5,740,357 A | 4/1998 | Gardiner et al. | 395/185.1 |
| 5,781,451 A | 7/1998 | Lofthus et al. | 364/571.01 |
| 5,945,981 A | 8/1999 | Paull et al. | 345/180 |
| 5,977,958 A | 11/1999 | Baron et al. | 345/179 |
| 6,008,798 A | 12/1999 | Mato, Jr. et al. | 345/168 |
| 6,069,594 A * | 5/2000 | Barnes et al. | 345/7 |
| 6,100,538 A | 8/2000 | Ogawa | 250/559.29 |
| 6,184,873 B1 * | 2/2001 | Ward et al. | 345/179 |
| 6,208,330 B1 | 3/2001 | Hasegawa et al. | 345/179 |
| 6,288,711 B1 | 9/2001 | Tanaka et al. | 345/179 |
| 6,414,673 B1 * | 7/2002 | Wood et al. | 345/173 |
| 6,504,530 B1 | 1/2003 | Wilson et al. | 345/173 |
| 6,731,270 B2 | 5/2004 | Tosaya | |
| 2001/0000666 A1 | 5/2001 | Wood et al. | 345/179 |
| 2002/0134594 A1 | 9/2002 | Taylor et al. | 178/18.01 |

FOREIGN PATENT DOCUMENTS

| | | |
|---|---|---|
| EP | 0730230 | 9/1996 |
| EP | 0753723 | 1/1997 |
| EP | 0953911 | 11/1999 |
| EP | 1128320 | 8/2001 |
| EP | 1128320 A1 | 8/2001 |
| FR | 2664423 | 1/1992 |
| FR | 2698191 | 5/1994 |
| JP | 11203043 | 7/1999 |
| WO | WO-0753723 | 1/1997 |
| WO | WO-00/23939 | 4/2000 |
| WO | WO00/28348 | 5/2000 |
| WO | WO-00/73976 | 12/2000 |

OTHER PUBLICATIONS

"Mimio Installation", *Virtual Ink*, www.mimio.com/support, 4 pgs.

Brenner, A.E., et al., "A Sonic Pen: A Digital Stylus System", *IEEE Transactions On Computers*, C-19, (Jun. 1970), 546-548.

* cited by examiner

WIRELESS DISPLAY SYSTEMS AND STYLII

RELATED APPLICATION

This application is a continuation of application U.S. Ser. No. 09/751,048, filed on Dec. 29, 2000, now issued as U.S. Pat. No. 6,717,073, which is incorporated herein by reference.

TECHNICAL FIELD

The inventive subject matter relates generally to input devices for computers and, more specifically, to input devices for generating input coordinates in display systems, and to wireless display systems.

BACKGROUND

Many different input devices exist for today's computer systems. Examples include keyboards, mice, graphics tablets, and touch screens. These devices have become widely available for desktop and laptop computer systems. Display systems (computer systems that project their displays) have fewer input devices readily available.

Input devices currently available for display systems include handheld mice, speech systems, and body gesture equipment such as virtual reality gloves. Handheld mice often operate with an infrared (IR) link to the computer. IR handheld mice are useful, but they interact with an IR receiver and not the display, so a user must have a line-of-sight path available to the IR receiver, which is often located at the computer. Speech systems have difficulty providing drawing capability, and body gestures have a small recognition domain.

For the reasons stated above, and for other reasons stated below that will become apparent to those skilled in the art upon reading and understanding the inventive subject matter, there is a need in the art for an alternate input device for display systems.

DESCRIPTION OF EMBODIMENTS

In the following detailed description of the embodiments, reference is made to the accompanying drawings that show, by way of illustration, specific embodiments in which the inventive subject matter may be practiced. In the drawings, like numerals describe substantially similar components throughout the several views. These embodiments are described in sufficient detail to enable those skilled in the art to practice them. Other embodiments may be utilized, and structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the inventive subject matter is defined only by the appended claims, along with the full scope of equivalents to which such claims are entitled.

The methods and apparatus of the inventive subject matter provide a mechanism to input coordinates to a large display system. A projection system coupled to a computer displays information on a projection surface. A stylus emits ultrasonic energy that is received by a plurality of receiving stations on the projection surface, and the receiving stations can triangulate the position of the stylus. The stylus has two ultrasonic transmitters. One transmitter is controlled by a manually-activated switch, and it is used for determining three-dimensional coordinates of the stylus relative to the projection surface. Another transmitter is controlled by a pressure-activated switch. The pressure-activated switch is turned on when the stylus is pressed against the projection surface.

Figure 1:
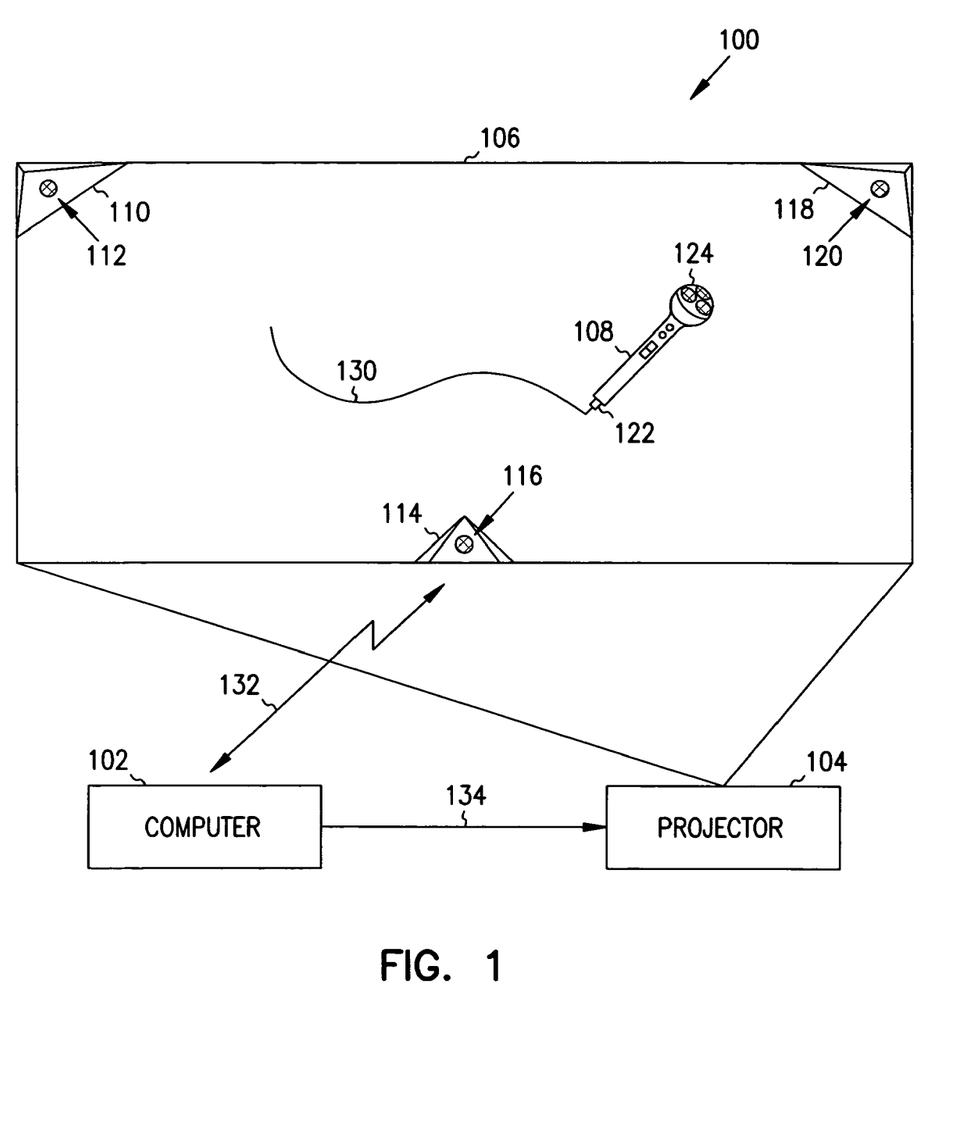
FIG. 1 shows a coordinate input system, according to an embodiment of the inventive subject matter.

FIG. 1 shows a coordinate input system 100, according to an embodiment of the inventive subject matter. Coordinate input system 100 includes computer 102, projector 104, stylus 108, and receiving stations 110, 114, and 118. Stylus 108 includes ultrasonic transmitters 122 and 124; and stations 110, 114, and 118 include ultrasonic receivers 112, 116, and 120, respectively. Computer 102 sends display information to projector 104 on link 134. Projector 104 projects the display information on projection surface 106. Stylus 108 functions as an input device to computer 102 by interacting with stations 110, 114, and 118, which, in turn, send stylus coordinate information to computer 102 on link 132.

In some embodiments, projection surface 106 is a wall, and projector 104 projects display information onto the wall. In other embodiment, projection surface 106 is a rear-projection screen, and projector 104 is located behind the screen such that information projected can be viewed from a viewable surface in front of the screen. Stations 110, 114, and 118 are mountable on projection surface 106. In some embodiment, stations 110, 114, and 118 are rigidly affixed to projection surface 106. For example, in embodiments that include a screen dedicated as projection surface 106, stations 110, 114, and 118 can be dedicated to the projection surface. In other embodiments, stations 110, 114, and 118 are not rigidly affixed to projection surface 106. For example, in embodiments where projection surface 106 is a wall, stations 110, 114, and 118 can be portable such that they can be mounted on any wall. In some embodiments, stations 110, 114, and 118 can be placed on walls of different size and shape to accommodate different displays generated by projector 104.

Stylus 108 includes ultrasonic transmitters 122 and 124. In some embodiments, ultrasonic transmitter 122 is used to input two-dimensional coordinate information, and ultrasonic transmitter 124 is used to input three-dimensional coordinate information. Ultrasonic transmitter 122 can be activated by a pressure-activated switch. When stylus 108 is pressed against projection surface 106, ultrasonic transmitter 122 turns on. Ultrasonic energy transmitted from ultrasonic transmitter 122 is received by stations 110, 114, and 118, and stylus coordinate information is sent to computer 102.

Computer 102 can utilize stylus coordinate information for any suitable purpose. For example, line 130 is shown as having been traced on projection surface 106 by stylus 108. As stylus 108 moves along line 130, computer 102 sends display information to projector 104 that includes line 130. As shown in the example of FIG. 1, ultrasonic transmitter 122 is used for two-dimensional coordinate input on projection service 106. In embodiments that only use stylus 108 for two-dimensional coordinate input, one of stations 110, 114, and 118 can be omitted; however, use of more than two stations can provide better accuracy through redundant information, or can provide a larger coverage range.

In some embodiments, ultrasonic transmitter 124 is used to input three-dimensional coordinate information. In these embodiments, ultrasonic transmitter 124 is turned on, and the location of stylus 108 is tracked in three dimensions by stations 110, 114, and 118.

Ultrasonic transmitters 122 and 124 can emit ultrasonic energy at any suitable frequency. In some embodiments, ultrasonic transmitters 122 and 124 emit energy at between 40 kHz and 80 kHz. Ultrasonic transmitters 122 and 124 can transmit at the same frequency, or at different frequencies. In embodiments where ultrasonic transmitters 122 and 124 transmit at the same frequency, ultrasonic receivers 112, 116, and 120 are designed to receive ultrasonic energy at the frequency transmitted. In embodiments where ultrasonic transmitters 122 and 124 transmit at different frequencies, each of receiving stations 110, 114, and 118 includes receivers to receive ultrasonic energy at at least two frequencies.

Ultrasonic transmitters 122 and 124 emit ultrasonic energy in bursts or pulses. In some embodiments, bursts are emitted at a rate of between 50 and 100 pulses per second. In some embodiments, stylus 108 includes a higher frequency transmitter in addition to ultrasonic transmitters 122 and 124. A corresponding higher frequency receiver is included in at least one of receiving stations 110, 114, and 118. The higher frequency transmitter is also a burst transmitter that can be used as a time reference for ultrasonic receivers 112, 116, and 120. The higher frequency transmitter can be, for example, a radio frequency (RF) transmitter or an infrared (IR) transmitter. Because the velocity of the higher frequency signals is much greater than the velocity of the ultrasonic energy, they are used as a time reference.

Stations 110, 114, and 118 receive the ultrasonic bursts, and at least one of stations 110, 114, and 118 receives the higher frequency bursts. In some embodiments, stations 110, 114, and 118 include processors that calculate the time of arrival of the ultrasonic bursts. Stations 110, 114, and 118 transfer the time of arrival to computer 102 using a wireless interface, such as the "Bluetooth" interface.

Figure 2:
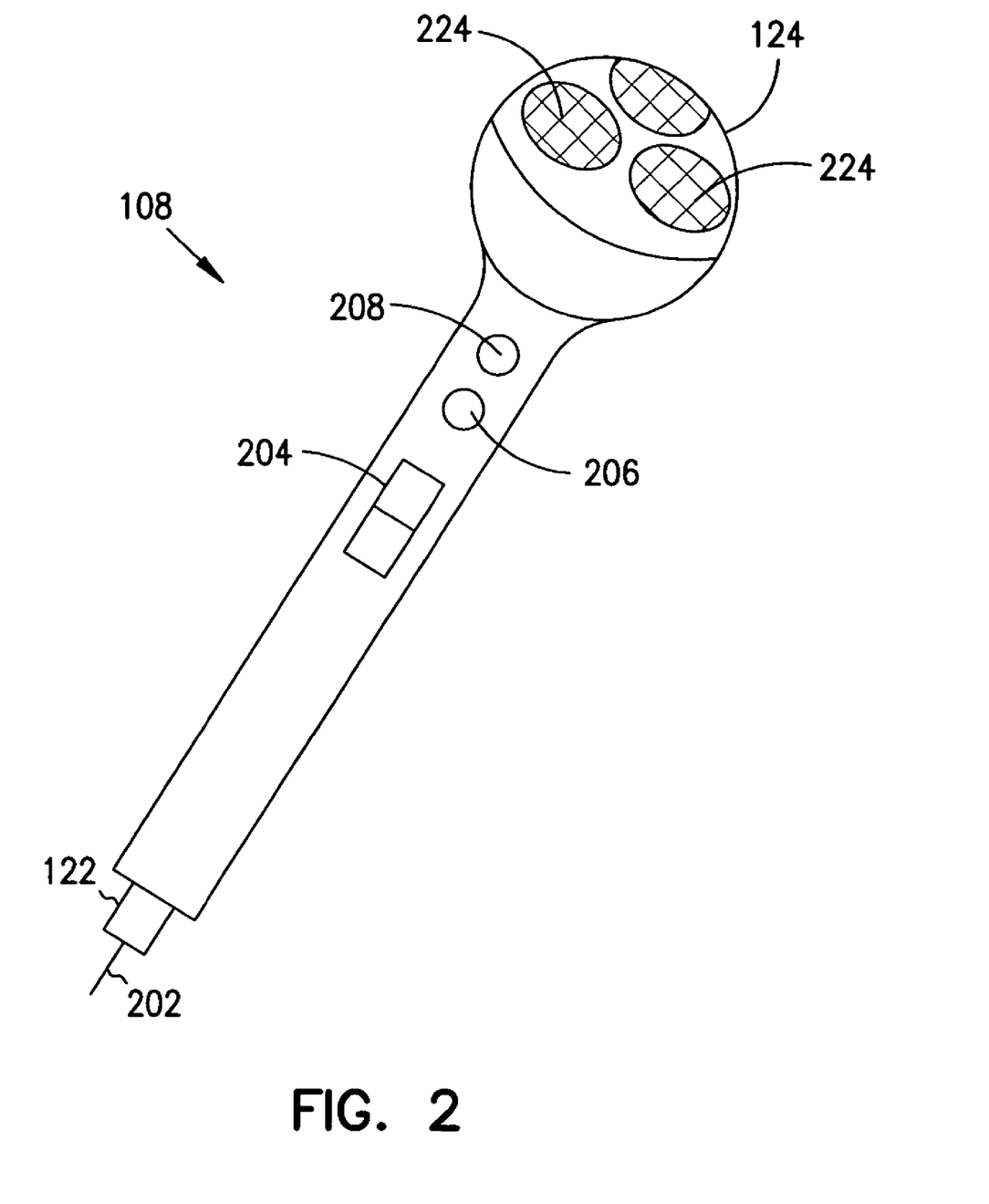
FIG. 2 shows a stylus, according to an embodiment of the inventive subject matter.

FIG. 2 shows a stylus 108, according to an embodiment of the inventive subject matter. Stylus 108 includes ultrasonic transmitter 122 near one end, ultrasonic transmitter 124 near another end, switch 204, and buttons 206 and 208. Switch 204 is used to select between absolute and relative coordinates. Either of buttons 206 and 208 operates a momentary manual switch that turns on ultrasonic transmitter 124. Buttons 206 and 208 can also emulate left and right mouse buttons.

In some embodiments, ultrasonic transmitter 124 includes a plurality of piezoelectric discs 224 arranged in a semi-hemispherical pattern. Piezoelectric discs 224 emit ultrasonic energy when switch 206 is on. Stylus 108 can be in any position relative to the receiving stations when switch 204 is turned on, and the position of stylus 108 can be triangulated by the receiving stations, or by computer 102 (FIG. 1).

Ultrasonic transmitter 122 is positioned near tip 202, which is coupled to a pressure-activated switch (not shown). When tip 202 is pressed against a surface such as projection surface 106 (FIG. 1), ultrasonic transmitter 122 turns on and emits ultrasonic energy. In some embodiments, ultrasonic transmitter 122 is a cylindrical, omni-directional transmitter made of a polymer material. The cylindrical shape allows tip 202 to pass through, and the omni-directional pattern allows receivers on the projection surface to receive the ultrasonic energy at an acceptable amplitude.

Figure 3:
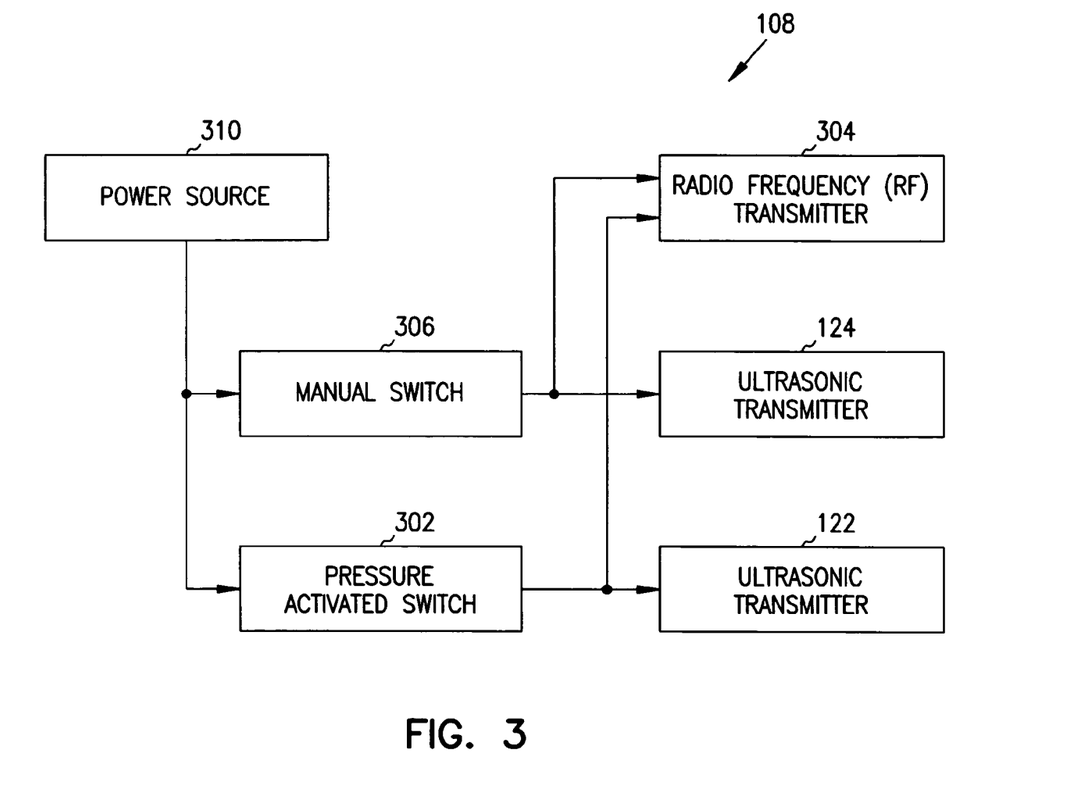
FIG. 3 shows a block diagram of a stylus, according to an embodiment of the inventive subject matter.

FIG. 3 shows a block diagram of a stylus 108, according to an embodiment of the inventive subject matter. Stylus 108 includes power source 310, manual switch 306, pressure-activated switch 302, RF transmitter 304, and ultrasonic transmitters 122 and 124. RF transmitter 304 is turned on when either of manual switch 306 or pressure-activated switch 302 is closed. When turned on, RF transmitter 304 transmits periodic RF pulses from stylus 108. Manual switch 306 is turned on whenever either of buttons 206 or 208 (FIG. 2) is depressed, and pressure-activated switch 302 is closed whenever pressure is applied to tip 202 (FIG. 2).

RF transmitter 304 is an example of a higher frequency transmitter suitable for use as a time reference between the stylus and a receiving station. Other types of higher frequency transmitters can be used without departing from the scope of the inventive subject matter. For example, in other embodiments, an infrared (IR) transmitter is used.

Figure 4:
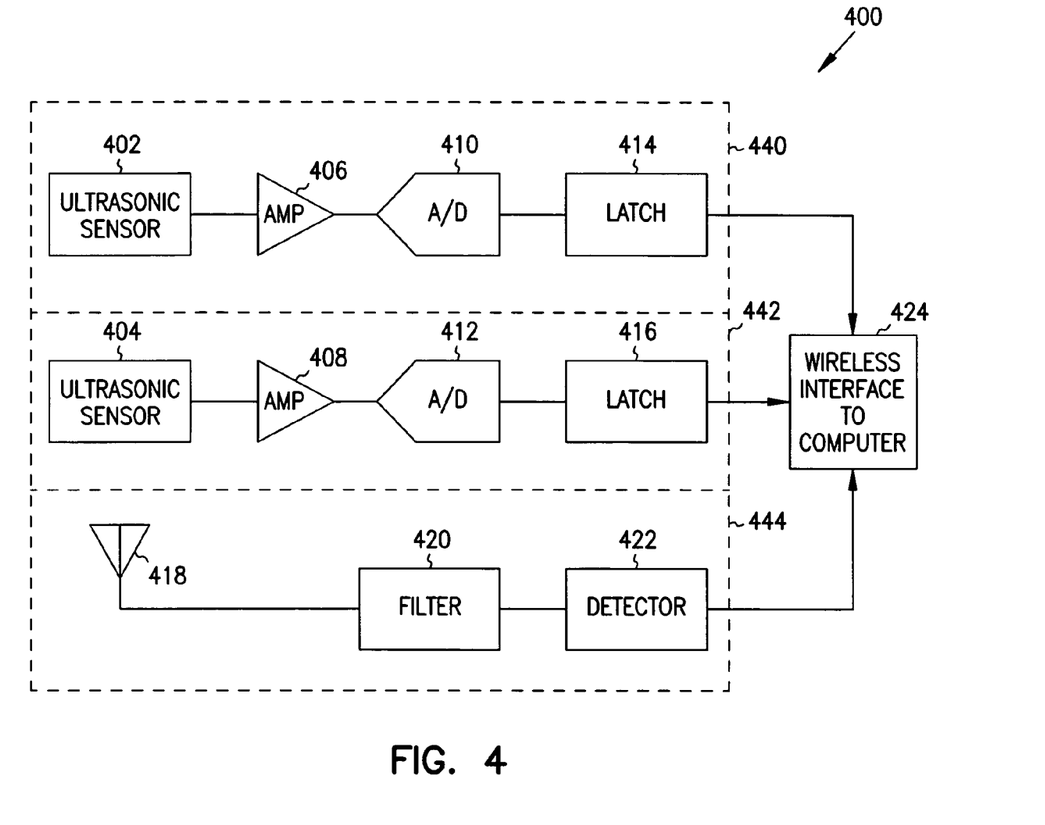
FIG. 4 shows a block diagram of a receiving station, according to an embodiment of the inventive subject matter.

FIG. 4 shows a block diagram of a receiving station 400, according to an embodiment of the inventive subject matter. Receiving station 400 is a receiving station such as receiving stations 110, 114, or 118 (FIG. 1). Receiving station 400 includes ultrasonic receivers 440 and 442, and RF receiver 444. Ultrasonic receiver 440 includes ultrasonic sensor 402, amplifier 406, analog-to-digital converter (A/D) 410, and latch 414. Ultrasonic receiver 442 includes ultrasonic sensor 404, amplifier 408, A/D 412, and latch 416. RF receiver 444 includes antenna 418, filter 420, and detector 422. Each of receivers 440, 442, and 444 provides information to wireless interface 424.

In the embodiment of FIG. 4, two ultrasonic receivers 440 and 442 are used. In some embodiments, amplifiers 406 and 408 include narrowband filters centered at different frequencies. This provides two ultrasonic receivers at different frequencies to receive ultrasonic signals from a stylus with two transmitters at different frequencies. In other embodiments, both transmitters on the stylus are at the same frequency, and one of ultrasonic receivers 440 and 442 is omitted.

RF receiver 444 receives radio frequency pulses, detects the time of arrival of the pulses, and provides the time of arrival to wireless interface 424. Ultrasonic receivers 440 and 442 receive ultrasonic pulses, and they provide the time of arrival of the ultrasonic pulses to wireless interface 424. Wireless interface 424 provides the time of arrival information to a computer such as computer 102 (FIG. 1). In some embodiments, wireless interface 424 includes a processor that determines the difference between the time of arrivals of RF pulses and ultrasonic pulses, and it provides the difference to the computer.

Figure 5:
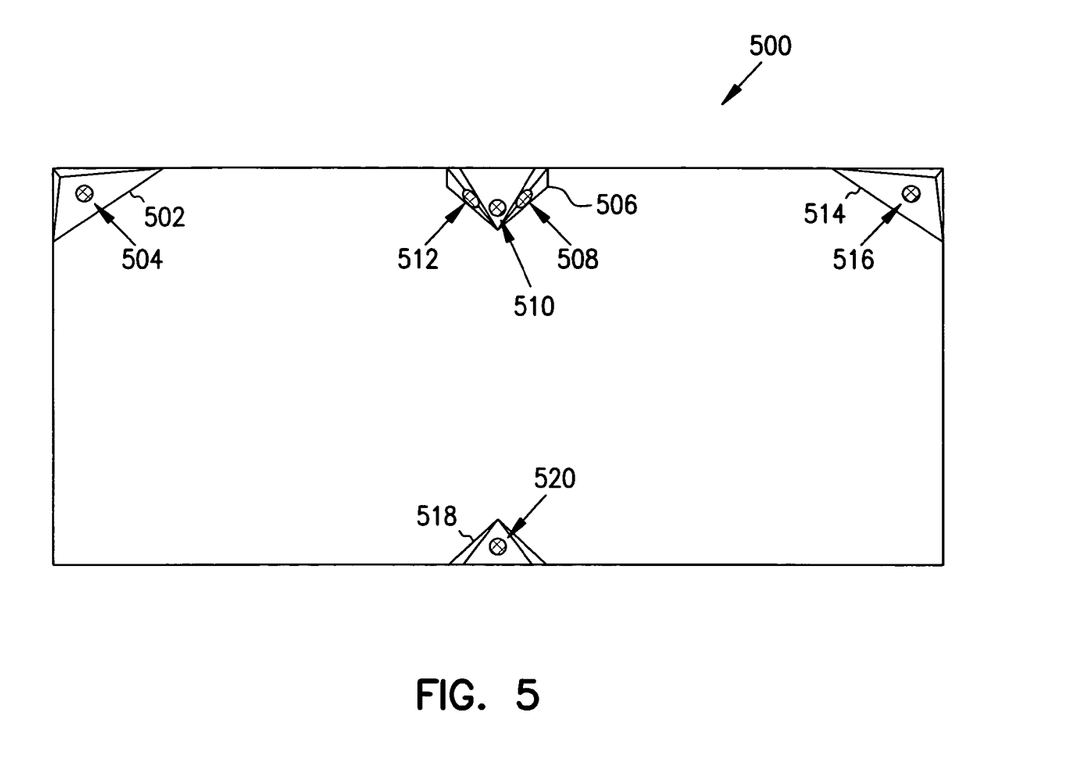
FIG. 5 shows a self-calibrating coordinate input system, according to an embodiment of the inventive subject matter.

FIG. 5 shows a self-calibrating coordinate input system 500, according to an embodiment of the inventive subject matter. Coordinate input system 500 includes receiving stations 502, 514, and 518. Receiving stations 502, 514, and 518 correspond to receiving stations 110, 114, and 118 of FIG. 1, respectively. Coordinate input system 500 also includes calibrating station 506. Calibrating station 506 is used to calibrate the distance between receiving stations, and in some embodiments it is also used as a receiving station in addition to those shown in FIG. 1.

Calibrating station 506 includes ultrasonic receiver 510, and it also includes ultrasonic transmitters 512 and 508. Ultrasonic transmitters 512 and 508 are useful to calibrate coordinate input system 500. When the receiving stations are hung on a wall to provide a projection surface, ultrasonic transmitters transmit ultrasonic energy at the same frequency as a stylus. The energy is received at the other receiving stations, and the time of arrival is communicated either back to calibrating station 506, or to a computer such as computer 102 (FIG. 1). The distance between receiving stations is then determined, and the system is calibrated.

In some embodiments, calibrating station 506 also includes a higher frequency transmitter to provide bursts of a higher frequency signal for use by the other receiving stations. For example, calibrating station 506 can include an RF transmitter to provide a time reference in the same manner as stylus 108 (FIG. 3).

It is to be understood that the above description is intended to be illustrative, and not restrictive. Many other embodiments will be apparent to those of skill in the art upon reading and understanding the above description. The scope of embodiments of the inventive subject matter should, therefore, be determined with reference to the appended claims, along with the full scope of equivalents to which such claims are entitled.

What is claimed is:

1. A stylus comprising:
   a stylus tip;
   a first ultrasonic transmitter controllable by application of pressure to the stylus tip;
   a second ultrasonic transmitter;
   a first switch to control the second ultrasonic transmitter; and
   a higher frequency transmitter to provide a time reference for the first and second ultrasonic transmitters;
   wherein the stylus is to use with a wireless display system having a projection plane and at least three ultrasonic receivers, wherein the first ultrasonic transmitter is to transmit ultrasonic energy to at least two of the ultrasonic receivers in determining a position of the stylus relative to the projection plane in two dimensions, and wherein the second ultrasonic transmitter is to transmit ultrasonic energy to at least three ultrasonic receivers in determining a position of the stylus relative to the projection plane in three dimensions.

2. The stylus of claim 1 wherein the first and second ultrasonic transmitters are to emit ultrasonic energy at different frequencies.

3. The stylus of claim 2 wherein the first and second ultrasonic transmitters are to emit ultrasonic energy between substantially forty kilohertz and eighty kilohertz.

4. The stylus of claim 1 wherein the first and second ultrasonic transmitters are to emit ultrasonic energy at the same frequency.

5. The stylus of claim 1 further comprising a pressure-activated switch coupled to the stylus tip, wherein the pressure-activated switch is operable to turn on the first ultrasonic transmitter when pressure is applied to the stylus tip.

6. The stylus of claim 5 further comprising a higher frequency transmitter to provide a time reference for the first and second ultrasonic transmitters, wherein the higher frequency transmitter is controllable by one of the first switch and the pressure-activated switch.

7. The stylus of claim 1 wherein the first ultrasonic transmitter is located at the stylus tip, and wherein the first ultrasonic transmitter comprises a polymer.

8. The stylus of claim 1 wherein the first ultrasonic transmitter is located at the stylus tip, wherein the first ultrasonic transmitter is cylindrical and formed of a polymer material, and wherein the first ultrasonic transmitter is to transmit onmi-directional ultrasonic energy.

9. The stylus of claim 1 wherein the second ultrasonic transmitter is located at an end of the stylus opposite the tip, and wherein the second ultrasonic transmitter comprises a piezoelectric material.

10. The stylus of claim 1 wherein the second ultrasonic transmitter is located at an end of the stylus opposite the tip, and wherein the second ultrasonic transmitter comprises a plurality of semi-hemispherical discs of piezoelectric material.

11. The stylus of claim 1 wherein the higher frequency transmitter comprises one of a radio frequency transmitter and an infrared transmitter.

12. The stylus of claim 1 wherein the first and second ultrasonic transmitters and the higher frequency transmitter are burst transmitters.

13. The stylus of claim 12 wherein the first and second ultrasonic transmitters are to transmit bursts between 50 and 100 pulses/second.

14. The stylus of claim 1, wherein at least one of the ultrasonic receivers includes a higher frequency receiver, and wherein the higher frequency transmitter is to transmit one of radio frequency energy and infrared energy to the higher frequency receiver.

15. A wireless display system comprising:
   at least three ultrasonic receivers mountable at different locations on a projection surface;
   a stylus comprising a first ultrasonic transmitter to transmit ultrasonic energy to the ultrasonic receivers, a second ultrasonic transmitter to transmit ultrasonic energy to the receivers, wherein the first and second ultrasonic transmitters are to transmit ultrasonic energy at different frequencies, wherein two-dimensional position coordinates of the stylus are to be determined when ultrasonic energy is received by the receivers at a first frequency, and wherein three-dimensional position coordinates of the stylus are to be determined when ultrasonic energy is received by the receivers at a second frequency; and
   a computer coupled to the ultrasonic receivers, wherein the computer is to determine the two-dimensional and three-dimensional position coordinates of the stylus relative to the projection surface.

16. The wireless display system of claim 15 wherein the first ultrasonic transmitter is controllable by a user-operable switch on the stylus.

17. The wireless display system of claim 15 wherein the first ultrasonic transmitter is located at an end of the stylus opposite a tip of the stylus, and wherein the first ultrasonic transmitter comprises a plurality of semi-hemispherical discs of piezoelectric material.

18. The wireless display system of claim 15 wherein at least one of the ultrasonic receivers is to calculate time of arrival information.

19. The wireless display system of claim 15 wherein the computer is coupled to the ultrasonic receivers via a wireless interface.

20. The wireless display system of claim 19 wherein the wireless interface comprises a processor to calculate time of arrival difference information.

21. The wireless display system of claim 15 further comprising a projection system responsive to the computer to project an image onto the projection surface.

22. The wireless display system of claim 15 wherein the stylus further comprises a second ultrasonic transmitter to transmit ultrasonic energy to the ultrasonic receivers, wherein the first and second ultrasonic transmitters are to transmit ultrasonic energy at the same frequency.

23. The wireless display system of claim 15 and further comprising a higher frequency receiver co-located with one of the ultrasonic receivers, and wherein the stylus further comprises a higher frequency transmitter to provide a time reference for the ultrasonic receivers.

* * * * *

UNITED STATES PATENT AND TRADEMARK OFFICE
CERTIFICATE OF CORRECTION

PATENT NO. : 7,248,251 B2 Page 1 of 1
APPLICATION NO. : 10/794695
DATED : July 24, 2007
INVENTOR(S) : Xu et al.

It is certified that error appears in the above-identified patent and that said Letters Patent is hereby corrected as shown below:

In column 6, line 10, in Claim 8, delete "onmi-directional" and insert
-- omni-directional --, therefor.

Signed and Sealed this

Eighteenth Day of September, 2007

JON W. DUDAS
*Director of the United States Patent and Trademark Office*